United States Patent [19]

Noren

[11] 4,384,013
[45] May 17, 1983

[54] VOLATILE AMINE-CURED TRIALKOXYSILYL-CONTAINING AQUEOUS LATEX COATINGS

[75] Inventor: Gerry K. Noren, Hoffman Estates, Ill.

[73] Assignee: DeSoto, Inc., Des Plaines, Ill.

[21] Appl. No.: 270,564

[22] Filed: Jun. 4, 1981

Related U.S. Application Data

[63] Continuation-in-part of Ser. No. 101,441, Dec. 10, 1979, abandoned.

[51] Int. Cl.$^3$ .......................... C23C 11/00; B05D 3/04
[52] U.S. Cl. ................................ 427/255.4; 427/340; 427/387; 524/547
[58] Field of Search ...................... 427/340, 255.4, 387; 260/29.2 M, 29.6 R, 29.6 T, 29.6 TA; 524/547

[56] References Cited

U.S. PATENT DOCUMENTS 4,101,492 7/1978 Lindemann et al. .......... 260/29.2 M

FOREIGN PATENT DOCUMENTS 680886 2/1964 Canada ................................. 427/340
672716 5/1952 United Kingdom ................ 427/340

Primary Examiner—Norman Morgenstern
Assistant Examiner—Janyce A. Bell
Attorney, Agent, or Firm—Dressler, Goldsmith, Shore, Sutker & Milnamow, Ltd.

[57] ABSTRACT

A method of forming a dry, cured coating on a substrate is disclosed in which an aqueous latex of emulsion copolymer particles containing a plurality of trialkoxysilyl groups is applied to a substrate to form a wet coating, the wet coating is exposed to a volatile amine to catalyze the curing reaction, and the amine-exposed wet coating is allowed to dry by vaporization of the volatile components present.

6 Claims, No Drawings

VOLATILE AMINE-CURED TRIALKOXYSILYL-CONTAINING AQUEOUS LATEX COATINGS

DESCRIPTION

CROSS-REFERENCE TO RELATED APPLICATION

This is a continuation-in-part of copending patent application Ser. No. 101,441, filed Dec. 10, 1979, now abandoned.

TECHNICAL FIELD

This invention relates to organosilicate coatings which can be deposited in the form of a latex coating composition and which can be cured at low temperatures, including room temperature.

BACKGROUND ART

Organosilicate coatings are usually prepared as two component systems which are mixed together shortly prior to use. The organosilicate portion of the coating is constituted by a resinous material carrying a plurality of silicon-carried alkoxy groups, this resinous material being itself a liquid or being dispersed or dissolved in a solvent or other volatile liquid. The second portion is a curing agent containing an amine or latent amine. When the two components are mixed together, the pot life is very short, normally less than about 20 minutes, so the systems must not only be prepared with care, but their use is difficult because the viscosity changes rapidly with time, and after a few minutes it is too late to use the mixture effectively.

The problem of shortened pot life due to the admixture of the resinous component containing silicon-carried alkoxy groups and amine curing agent is said to be solved to some extent for the production of silicone rubber films from organic solvent systems by the teachings of Canadian Pat. No. 680,886 to Votaw. Votaw teaches that a solvent solution of a mixture of a liquid to gummy diorganopolysiloxane and a liquid polyfunctional silane or siloxane can be applied as a film to a substrate and cured by exposing the film to the vapors of an amine or ammonia to form a silicone rubber film. There are, however, several drawbacks to Votaw's systems.

First, Votaw's compositions contain two silicon-containing components; a hydroxy-endblocked diorganopolysiloxane and a liquid cross-linking agent containing an alkyl trialkoxysilane, an alkyl orthosilicate or liquid partial hydrolyzates of either or both types of cross-linking agent. Thus, two different materials must be compounded to prepare the silicone rubber film. Additionally, diorganopolysiloxanes are relatively expensive and do not offer a wide range of film properties once they are cured, Votaw teaching only the preparation of silicone rubber films.

Second, the coating systems disclosed by Votaw are dissolved in an organic solvent such as xylene, toluene, benzene, hexane, butanol or 2-ethylhexanol. This fact leads to two other problems. The first is the skyrocketing cost of organic solvents which has occurred in recent years. The second problem with the use of organic solvents relates to the environmental and inflammatory effects of such solvents. For example, there is a potential health hazard to the workers who must breathe the vapors of Votaw's organic solvents when using his system. In addition, it is well known that solvents such as benzene, xylene, toluene and hexane are extremely flammable and the use of these solvents requires special explosion-proof apparatus.

On the other hand, the invention described hereinafter utilizes only one ingredient which contains a silicon atom, rather than the two silicon atom-bearing entities of Votaw, and because the compositions utilized in the instant invention are aqueous latex emulsions containing substantially no organic solvent, the environmental and flammability risks inherent in Votaw's systems are substantially eliminated.

DISCLOSURE OF THE INVENTION

The present invention contemplates the formation of a dry, cured coating by application to a substrate of an aqueous latex of emulsion copolymer particles, which particles contain the copolymer providing a plurality of pendant trialkoxysilyl or $-Si(OR)_3$ groups, wherein R is an alkyl group having 1–4 carbon atoms, to form a wet coating on the substrate. The wet-coated substrate is then exposed at a low temperature, such as room temperature, for a short period of time, to a gaseous amine which serves to catalyze the curing reaction of the trialkoxysilyl groups in the coating. Thereafter, the amine-exposed wet coating is allowed to stand to allow removal of volatile components by vaporization and to permit the catalyzed cure to be completed. This provides a dry, cured coating.

As noted before, the method of this invention provides several benefits and advantages over previously used systems. One benefit is that the film-forming copolymer particles can be tailored to specific coating uses because of the wide range of monoethylenically unsaturated monomers which can be utilized in their preparation. A particular advantage of this invention is that the compositions utilized herein are substantially less expensive than are those used previously. In this respect, the high molecular weight provided by the aqueous emulsion copolymerization requires few crosslinks for a good cure, so relatively small amounts of the monomer providing the trialkoxysilyl group are needed, and this is the expensive monomer. Another advantage of the instant invention is that workers using its method, or others near its use, are not subjected to potentially harmful and flammable organic solvent vapors. Another benefit of the present invention is that it can use a single film-forming copolymer so that mixing particular amounts of different ingredients is not needed, thereby allowing utilization of less technically skilled personnel in the compounding of its film-forming composition and also when that composition is applied to a substrate.

Cure of the formed film is evidenced by the achievement of insolubility in organic solvents capable of dissolving the uncured copolymer itself, typically methyl ethyl ketone (MEK). This is conventionally tested by rubbing the solid coating with an MEK-saturated cloth and counting the number of back-and-forth rubs needed to remove the coating.

The latex of emulsion copolymer particles containing pendant trialkoxysilyl groups is prepared by the aqueous emulsion copolymerization of monomers consisting essentially of monoethylenically unsaturated monomers. The monoethylenically unsaturated monomers and the copolymers made therefrom are constituted by at least about 80 percent by weight nonreactive monomers. The term "nonreactive" is used herein to denote the incapacity for reaction of these monomers under the conditions of polymerization and cure, except to polymerize by their single ethylenic group. Nonreactive monomers are necessary to minimize the ultimate crosslink density of the cured coating, and to prevent a premature cure.

The usual nonreactive monomers which constitute the principal amount of the emulsion copolymer particles contain a single ethylenic group and no other functional group. Illustrative monomers are ethyl acrylate, styrene, butyl acrylate, methyl methacrylate and vinyl acetate.

In addition to the nonreactive monomers, the emulsion copolymer particles and monoethylenically unsaturated monomer mixture from which the copolymers are prepared preferably contain about 1 to about 20 weight percent, and more preferably about 3 to about 7 weight percent, of a monoethylenically unsaturated monomer which contains a single trialkoxysilyl group. These trialkoxysilyl groups provide the plurality of pendant trialkoxysilyl groups in the copolymer which is formed.

In typical practice, a hydroxyalkyltrialkoxysilane, such as 3-hydroxypropyltrimethoxysilane is reacted with a monoethylenically unsaturated ester, such as methyl methacrylate in an ester exchange reaction to form the monoethylenically unsaturated trialkoxysilyl monomer useful herein. The alkoxy portions of the trialkoxysilyl group preferably contain 1–4 carbon atoms in each alkoxy group, with methoxy or ethoxy groups being particularly preferred. Thus, in the trialkoxysilyl group, $-Si(OR)_3$, the R group preferably contains 1–4 carbon atoms, and R is more preferably methyl or ethyl.

The copolymer particles, and monomer mixture from which they are prepared, can also contain up to about 5 percent reactive monoethylenically unsaturated monomers. Reactive monomers include those which contain carboxylic acid or alcohol functionality, and are exemplified by acrylic acid, methacrylic acid, hydroxyethyl acrylate, and the like.

The copolymers useful herein are prepared by typical emulsion copolymerization practices wherein addition copolymerization techniques, such as free radical copolymerization, are employed. The latices so produced preferably contain about 40 to about 60 weight percent copolymer solids. The copolymers so prepared preferably have glass transition temperatures (Tg) below room temperature (about 20° C.), and more preferably, the Tg is from about 15° C. to about −20° C.

Any volatile amine can be used to catalyze the cure. Examples of useful amines include ammonia, primary amines such as methylamine, ethylamine, and ethanolamine, the latter being preferred. Secondary amines such as dimethylamine and diethylamine are also useful, as are tertiary amines, such as dimethylethanolamine and triethylamine. The action of the amine is catalytic and it does not appear to enter into the cure as a reactant. This is what allows mere exposure to a gas to function effectively.

Curing times of about 10 seconds to about 30 minutes are typically employed herein. Preferably, however, curing times of about 30 seconds to about 10 minutes are utilized. The term "curing time" is used herein to denote the time for which the volatile amine emulsion copolymer particles coated on the substrate are kept in contact. After curing, any drying time needed to complete the removal of the aqueous portion of the latex by vaporization is provided and a dry, cured coating film is formed. The cure may continue after the coating film is dry and when the amine vapors are not present.

In addition to the water and emulsion copolymer particles, the compositions useful herein can also contain fillers, pigments, stabilizers and the like.

The compositions useful herein can be applied to the substrate to be coated by several means well known in the art. Examples of typical applications include dipping, spraying and painting with a brush or roller.

The invention is illustrated as follows.

BEST MODE FOR CARRYING OUT THE INVENTION

Example

Steel panels (Parker test panels EP-2, cold rolled steel-Bonderite neutral, deionized water rinsed) were coated with wet films of polymers containing a hydrolizable $-Si(OR)_3$ moiety using a 0.006" Bird applicator. The panels were then exposed to ethanolamine vapors by inserting them into the gas space of a large beaker (4-liter) containing about 25 milliliters of liquid ethanolamine at room temperature for zero or three minutes. The results of these experiments are shown in Table I.

TABLE I

| CURING OF ORGANOSILICATE BINDERS WITH ETHANOLAMINE VAPOR | | | |
|---|---|---|---|
| Binder | Gas Time | Setting Time | Results |
| Acrylic latex[1] | 0 min. | 24 hrs. | 11 MEK rubs film dissolved |
| Acrylic latex[1] | 3 mins. | 24 hrs. | 25 MEK rubs film intact |

[1]An emulsion polymer containing 22.9% butyl acrylate, 22.9% methyl methacrylate, 0.2% methacrylic acid, 2.4% gamma-methacryloxypropyl-trimethoxysilane (available under the designation A-174 from Union Carbide Corporation), and 51.6% water, and having the following physical properties:
Percent solids 47.9
Average particle size 0.12 microns
pH 7.0–7.5
$T_g$ 10° C.
Minimum Film Forming Temperature 65° F.

I claim:

1. A method of forming a dry, cured coating at low temperature comprising applying an aqueous latex of emulsion copolymer particles to a substrate to form a wet coating on said substrate, the copolymer of said particles comprising at least about 80 percent by weight of copolymerized monoethylenically unsaturated monomers containing a single ethylenic group and no other reactive functional group, and having a plurality of pendant $-Si(OR)_3$ groups wherein R is an alkyl group having 1–4 carbon atoms, catalytically curing said wet coating on said substrate by exposing said wet coating to vapors of a volatile amine for a time period of about 10 seconds to about 30 minutes, and allowing said amine-exposed wet coating to stand to allow removal of volatile components by vaporization, and the cure to be completed.

2. The method of claim 1 wherein R is ethyl or methyl.

3. The method of claim 1 wherein said volatile amine is ethanolamine.

4. The method of claim 1 wherein said emulsion copolymer particles are made by the aqueous emulsion copolymerization of monomers consisting essentially of monoethylenically unsaturated monomers, said monomers comprising at least about 80 percent by weight monoethylenically unsaturated monomers containing a single ethylenic group and no other reactive functional group, and about 1 to about 20 weight percent of a monoethylenically unsaturated monomer containing a single trialkoxysilyl group wherein the alkoxy portions of said trialkoxysilyl group contain 1-4 carbon atoms.

5. The method of claim 4 wherein said monoethylenically unsaturated monomer containing a single trialkoxysilyl group is present in said copolymer at about 3 to about 7 percent by weight.

6. The method of claim 4 wherein there is also present up to about 5 percent by weight of monomers selected from monoethylenically unsaturated monomers containing carboxylic acid or alcohol functionality.

* * * * *